United States Patent
Murez et al.

(10) Patent No.: US 11,620,527 B2
(45) Date of Patent: Apr. 4, 2023

(54) DOMAIN ADAPTION LEARNING SYSTEM

(71) Applicant: HRL Laboratories, LLC, Malibu, CA (US)

(72) Inventors: Zachary Murez, La Jolla, CA (US); Soheil Kolouri, Calabasas, CA (US); Kyungnam Kim, Oak Park, CA (US); Mohammad Rostami, Santa Monica, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 1074 days.

(21) Appl. No.: 16/262,878

(22) Filed: Jan. 30, 2019

(65) Prior Publication Data
US 2019/0244107 A1    Aug. 8, 2019

Related U.S. Application Data

(60) Provisional application No. 62/627,179, filed on Feb. 6, 2018.

(51) Int. Cl.
| | |
|---|---|
| G06N 3/08 | (2006.01) |
| G06N 3/084 | (2023.01) |
| G06N 20/00 | (2019.01) |
| G06T 7/00 | (2017.01) |

(52) U.S. Cl.
CPC ............ *G06N 3/084* (2013.01); *G06N 20/00* (2019.01); *G06T 7/0002* (2013.01); *G06T 2207/20081* (2013.01); *G06T 2207/20084* (2013.01)

(58) Field of Classification Search
CPC ...... G06N 3/084; G06N 20/00; G06N 3/0472; G06N 3/08; G06N 3/0454; G06T 7/0002; G06T 2207/20081; G06T 2207/20084; G06K 9/6259; G06K 9/6271; G06V 10/82; G06V 20/56

USPC .......................................................... 706/20
See application file for complete search history.

(56) References Cited

U.S. PATENT DOCUMENTS

| | | | |
|---|---|---|---|
| 2017/0161633 | A1 | 6/2017 | Clinchant et al. |
| 2017/0206434 | A1 | 7/2017 | Nariyambut Murali et al. |

FOREIGN PATENT DOCUMENTS

WO    WO2017192194 A2    11/2017

OTHER PUBLICATIONS

J. Hoffman, D. Wang, F. Yu, and T. Darrell, "Fcns in the wild: Pixel-level adversarial and constraint-based adaptation," arXiv preprint arXiv:1612.02649, 2016, pp. 597-613 and Supplemental Material pp. 1-5.

M. Ghifary, W. B. Kleijn, M. Zhang, D. Balduzzi, and W. Li, "Deep reconstruction-classification networks for unsupervised domain adaptation," in European Conference on Computer Vision. Springer, pp. 597-613, 2016.

(Continued)

*Primary Examiner* — Stephen P Coleman
(74) *Attorney, Agent, or Firm* — Tope-Mckay & Associates

(57) ABSTRACT

Described is a system for adapting a deep convolutional neural network (CNN). A deep CNN is first trained on an annotated source image domain. The deep CNN is adapted to a new target image domain without requiring new annotations by determining domain agnostic features that map from the annotated source image domain and a target image domain to a joint latent space, and using the domain agnostic features to map the joint latent space to annotations for the target image domain.

17 Claims, 9 Drawing Sheets

(56) References Cited

OTHER PUBLICATIONS

J.-Y. Zhu, T. Park, P. Isola, and A. A. Efros, "Unpaired image-to-image translation using cycle-consistent adversarial networks," arXiv preprint arXiv:1703.10593, 2017, pp. 1-18.
A. Gaidon, Q. Wang, Y. Cabon, and E. Vig, "Virtual worlds as proxy for multi-object tracking analysis," in Proceedings of the IEEE Conference on Computer Vision and Pattern Recognition, pp. 4340-4349, 2016.
M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proc. of the IEEE Conference on Computer Vision and Pattern Recognition (CVPR), 2016, pp. 3213-3223.
I. Goodfellow, J. Pouget-Abadie, M. Mirza, B. Xu, D. Warde-Farley, S. Ozair, A. Courville, and Y. Bengio, "Generative adversarial nets," in Advances in neural information processing systems, pp. 2672-2680, 2014.
X. Mao, Q. Li, H. Xie, R. Y. Lau, and Z. Wang, "Multi-class generative adversarial networks with the l2 loss function," arXiv preprint arXiv:1611.04076, 2016, pp. 1-15.
M. Arjovsky, S. Chintala, and L. Bottou, "Wasserstein gan," arXiv preprint arXiv:1701.07875, 2017, pp. 1-32.
F. Yu, V. Koltun, and T. Funkhouser, "Dilated residual networks," arXiv preprint arXiv:1705.09914, 2017, pp. 1-9.
G. Huang, Z. Liu, K. Q. Weinberger, and L. van der Maaten, "Densely connected convolutional networks," arXiv preprint arXiv:1608.06993, 2016, pp. 1-9.
Zak Murez, Soheil Kolouri, David Kriegman, Ravi Ramamoorthi, Kyungnam Kim, "Image to Image Translation for Domain Adaptation," arXiv:1712.00479v1 [cs CV] Dec. 1, 2017, pp. 1-11.
Notification of Transmittal of International Search Report and the Written Opinion of the International Searching Authority for PCT/US2019/015927; dated May 21, 2019.
International Search Report of the International Searching Authority for PCT/US2019/015927; dated May 21, 2019.
Written Opinion of the International Searching Authority for PCT/US2019/015927; dated May 21, 2019.
Zak Murez et al. 'Image to Image Translation for Domain Adaptation', arXiv:1712.00479v1, Dec. 1, 2017.
Yaroslav Ganin, et al., "Unsupervised Domain Adaptation by Backpropagation," arXiv: 1409.749v2, Feb. 27, 2015.
Notification of the International Preliminary Report on Patentability Chapter I for PCT/US2019/015927; dated Aug. 20, 2020.
The International Preliminary Report on Patentability Chapter I for PCT/US2019/015927; dated Aug. 20, 2020.
Extended European Search report for the European Regional Phase Patent Application No. 19750519.1, dated Oct. 19, 2021.
Jaeyoon Yoo, et al: "Domain Adaptation Using Adversarial Learning for Autonomous Navigation," arxiv.org. Cornell University Library. 201, Olin Library Cornell University Ithaca. NY 14853, Dec. 11, 2017 (Dec. 11, 2017).
Zak Murez, et al: "Image to Image Translation for Domain Adaptation," arxiv.org. Cornell University Library. 201, Olin Library Cornell University Ithaca. NY 14853, Dec. 1, 2017 (Dec. 1, 2017).

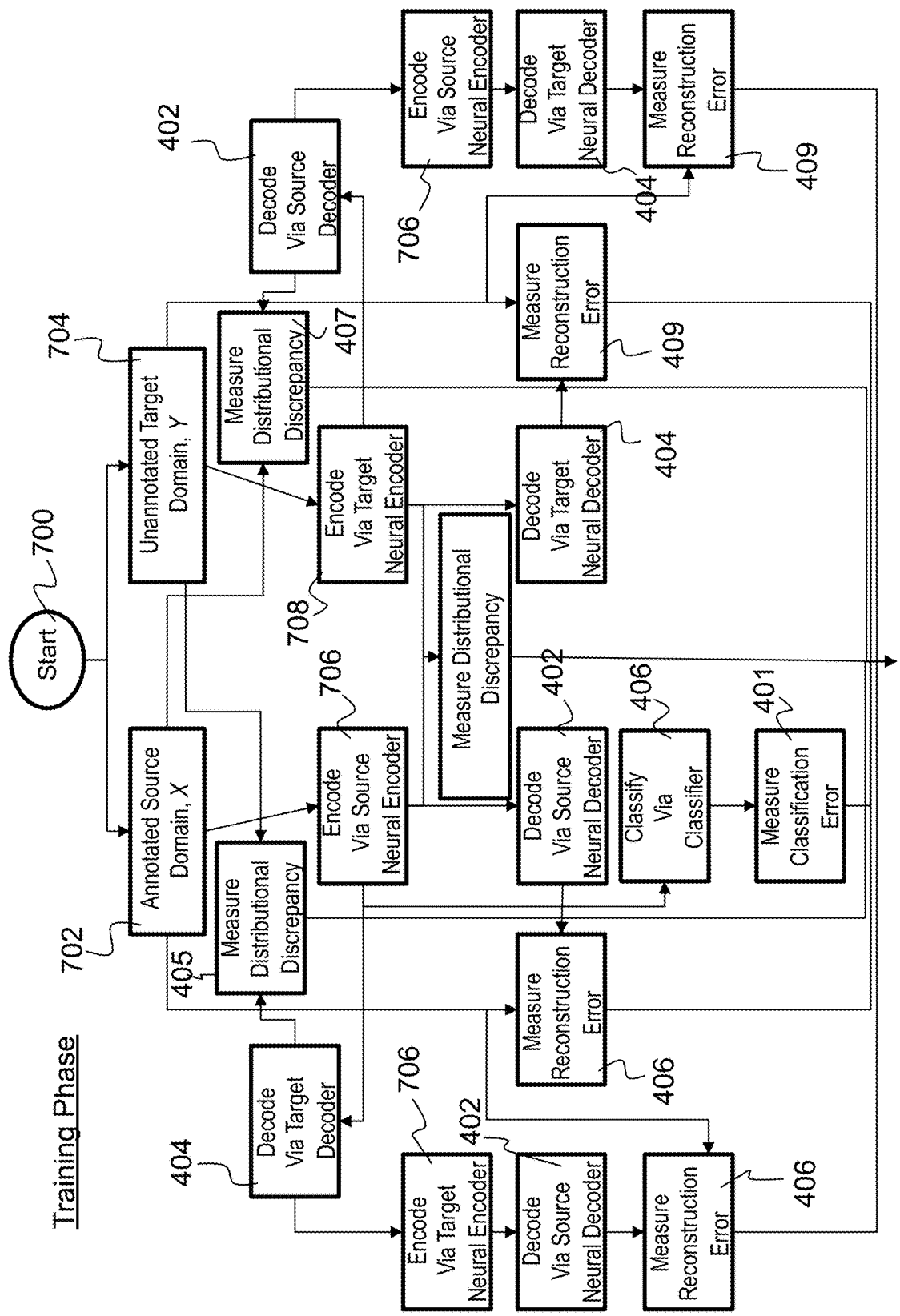

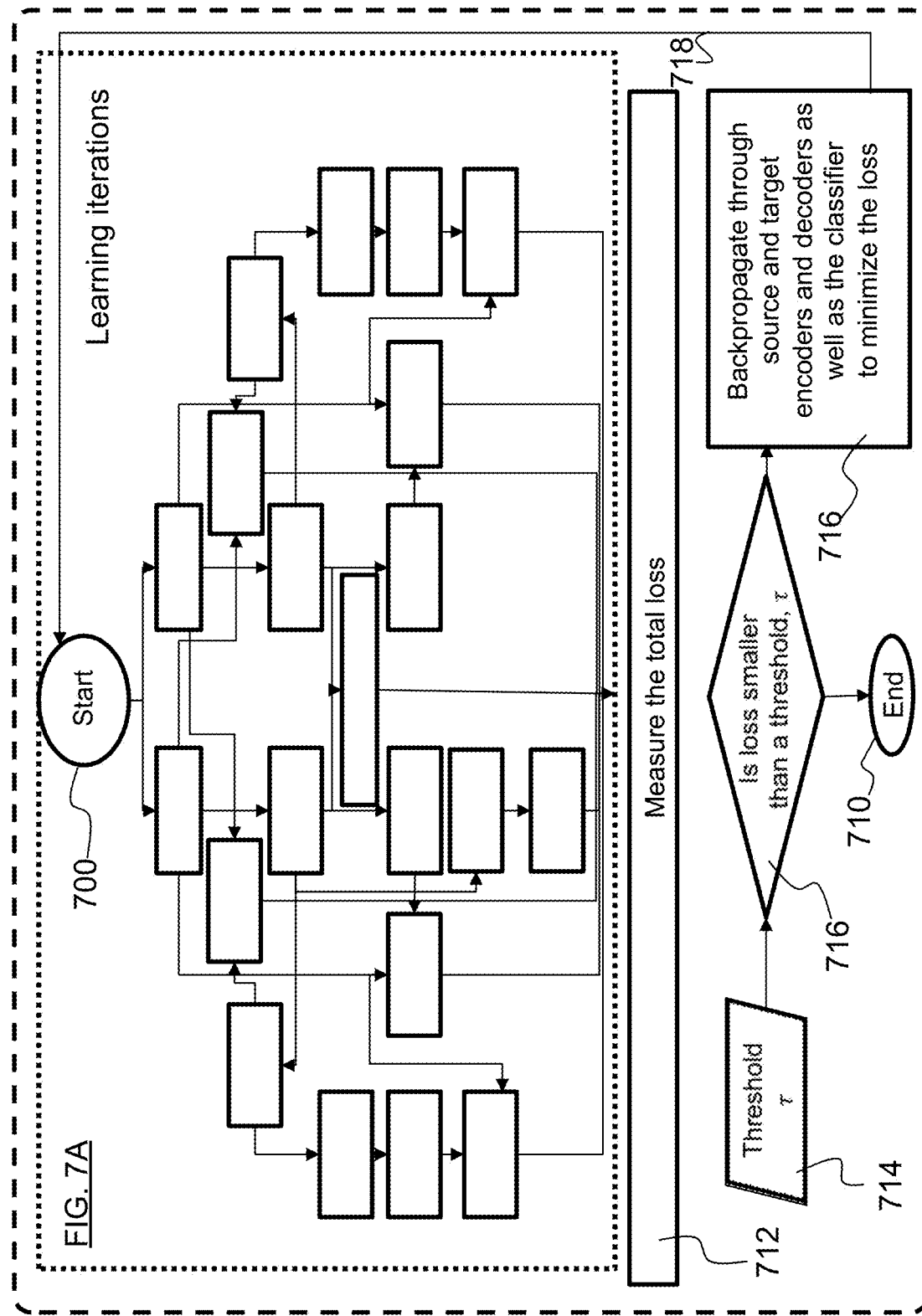

DOMAIN ADAPTION LEARNING SYSTEM

CROSS-REFERENCE TO RELATED APPLICATIONS

This is a Non-Provisional application of U.S. Provisional Application No. 62/627,179, filed in the United States on Feb. 6, 2018, entitled, "Domain Adaptation Learning System," the entirety of which is incorporated herein by reference.

BACKGROUND OF INVENTION

(1) Field of Invention

The present invention relates to a system for adapting a deep convolutional neural network and, more particularly, to a system for adapting a deep convolutional neural network trained on a source domain with labels to a target domain without requiring any new labels.

(2) Description of Related Art

Deep convolutional neural networks (CNNs) achieve state-of-the-art performance on many image understanding tasks, including classification, segmentation, monocular depth estimation, and captioning. These networks require huge amounts of training images (tens of thousands to millions), which, depending on the application, could be relatively easy to collect, but also require the training images to be annotated. Human annotation is often used as the ground truth label that the network is expected to learn to predict. Obtaining human annotations/labeling is extremely time consuming, costly, and does not scale well.

Domain adaptation attempts to solve this problem by allowing a network to be trained on an existing labeled dataset, and then adapted to a new image domain using images from the target domain with minimal or no labels/annotations. CNNs are made of two parts: a deep feature extractor, which maps an input image into a feature space, and a linear classifier (or regressor), which maps the features to the desired output.

Many methods for domain adaptation exist. For instance, the method described by Hoffman et al. (see the List of Incorporated Literature References, Literature Reference No. 1) involves a CNN feature extractor, a linear classifier, and a CNN discriminator. The feature extractor extracts features from both source domain (e.g., domain 'A') images and target domain images (e.g., domain 'B'). Features from the source domain are annotated using the classifier. Here, the loss is computed and back-propagated for training, using the ground truth labels. Note that this cannot be done for the target domain images, as no ground truth labels/annotations are available. Instead, features from both domains are passed to the discriminator, which is trained to distinguish between features from the two respective domains. Meanwhile, the feature extractor is trained so the discriminator cannot distinguish between the two domains. Through this antagonistic process, the feature extractor learns to extract features that are domain agnostic, allowing the classifier to be applied to both domains.

Ghifary et al. (see Literature Reference No. 2) augmented the standard feature extractor and classifier with an additional component for training. Here, they use an image decoder, which maps the features back to images. By requiring the features to be able to reconstruct the input image for the target domain, they also add some domain agnosticism to the model.

The system of Zhu et al. (see Literature Reference No. 3) is used for the task of image to image translation, where given an image in the source domain, they make it appear as if it came from the target domain. For example, given an image taken during the summer, make it appear as if it was taken during the winter.

While methods for domain adaptation exist, a continuing need exists for a system for transfer learning based on domain agnostic features.

SUMMARY OF INVENTION

The present invention relates to a system for adapting a deep convolutional neural network and, more particularly, to a system for adapting a deep convolutional neural network trained on a source domain with labels to a target domain without requiring any new labels. The system comprises one or more processors and a non-transitory computer-readable medium having executable instructions encoded thereon such that when executed, the one or more processors perform multiple operations. The system trains a deep CNN on an annotated source image domain. The deep CNN is adapted to a new target image domain without requiring new annotations by determining domain agnostic features that map from the annotated source image domain and a target image domain to a joint latent space, and using the domain agnostic features to map the joint latent space to annotations for the target image domain.

In another aspect, the joint latent space is invariant to any structured noise variations between the annotated source image domain and the target image domain.

In another aspect, decoders add back structured noise variations for reconstructing each image domain from its domain agnostic features in the joint latent space.

In another aspect, the joint latent space is regularized by a plurality of auxiliary networks and loss functions.

In another aspect, in using the domain agnostic representations to map the joint latent space to annotations for the target image domain, the system uses an adversarial setting in which a discriminator tries to classify if a domain agnostic feature in the joint latent space was generated from the annotated source image domain or the target image domain. A cross entropy loss function that is defined as a number of correct classifications of the discriminator is optimized.

In another aspect, in using the domain agnostic representations to map the joint latent space to annotations for the target image domain, the system encodes an image from its actual domain to the joint latent space via an encoder, wherein the actual domain is one of the annotated source image domain and the target image domain. The image is decoded to the other domain via a decoder, wherein the other domain is the other of the annotated source image domain and the target image domain, such that a synthetic image is generated. The system identifies if the synthetic image belongs to the actual domain or the other domain.

In another aspect, wherein the system encodes the synthetic image back to the joint latent space, and decodes the synthetic image back to its actual domain.

In another aspect, a device is controlled based on the annotations for the target image domain.

In another aspect, the device is a mechanical component of an autonomous vehicle.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is a flow diagram illustrating a training phase according to some embodiments of the present disclosure;

FIG. 7B is a continuation of FIG. 7A illustrating the training phase according to some embodiments of the present disclosure.

DETAILED DESCRIPTION

Figure 1:
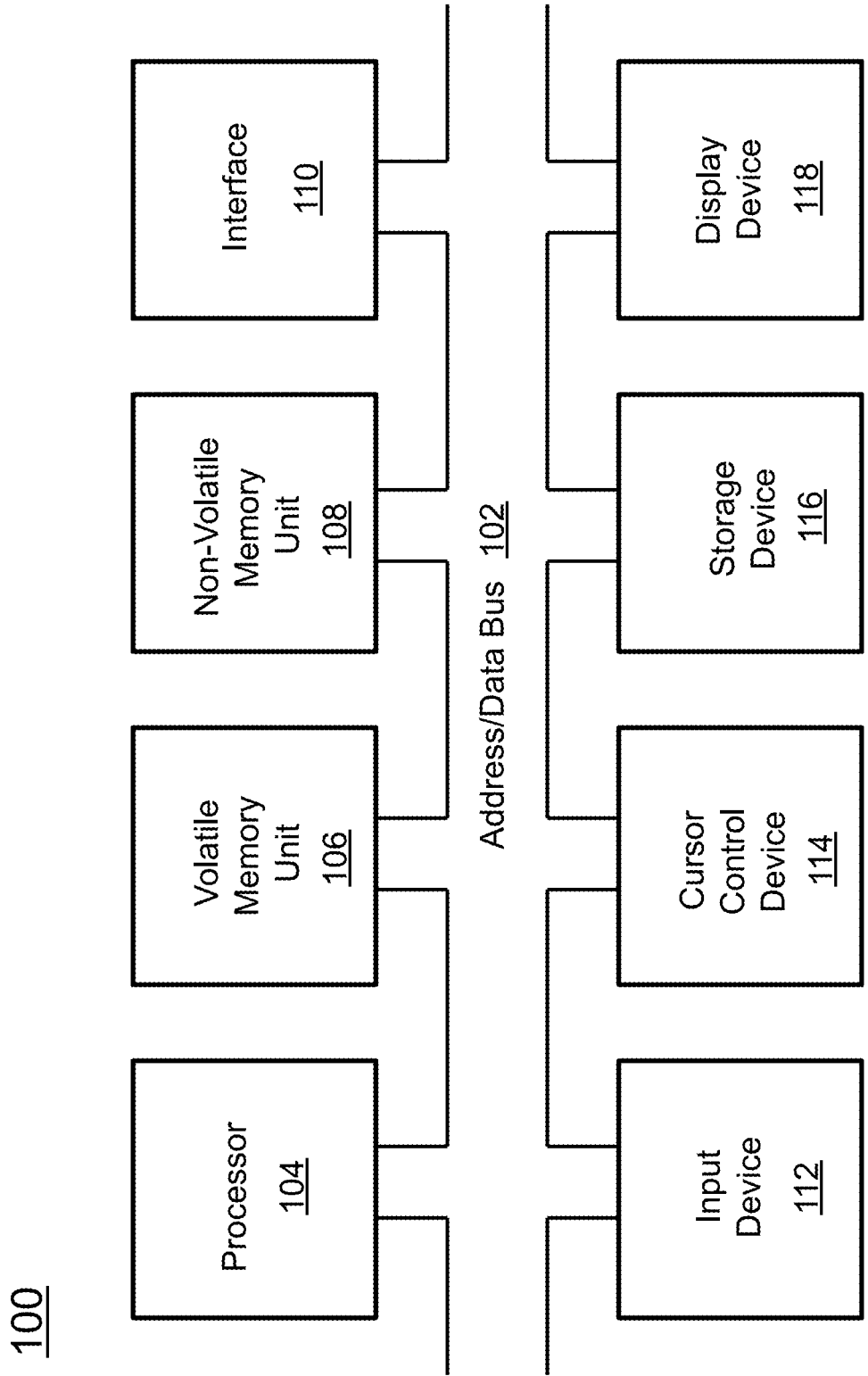
FIG. 1 is a block diagram depicting the components of a system for adapting a deep convolutional neural network according to some embodiments of the present disclosure.

The present invention relates to a system for adapting a deep convolutional neural network and, more particularly, to a system for adapting a deep convolutional neural network trained on a source domain with labels to a target domain without requiring any new labels. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. J. Hoffman, D. Wang, F. Yu, and T. Darrell, "Fens in the wild: Pixel-level adversarial and constraint-based adaptation," arXiv preprint arXiv:1612.02649, 2016.
2. M. Ghifary, W. B. Kleijn, M. Zhang, D. Balduzzi, and W. Li, "Deep reconstruction-classification networks for unsupervised domain adaptation," in European Conference on Computer Vision. Springer, pp. 597-613, 2016.
3. J.-Y. Zhu, T. Park, P. Isola, and A. A. Efros, "Unpaired image-to-image translation using cycle-consistent adversarial networks," arXiv preprint arXiv:1703.10593, 2017.
4. A. Gaidon, Q. Wang, Y. Cabon, and E. Vig, "Virtual worlds as proxy for multi-object tracking analysis," in Proceedings of the IEEE Conference on Computer Vision and Pattern Recognition, pp. 4340-4349, 2016.
5. M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proc. of the IEEE Conference on Computer Vision and Pattern Recognition (CVPR), 2016.
6. I. Goodfellow, J. Pouget-Abadie, M. Mirza, B. Xu, D. Warde-Farley, S. Ozair, A. Courville, and Y. Bengio, "Generative adversarial nets," in Advances in neural information processing systems, pp. 2672-2680, 2014.
7. X. Mao, Q. Li, H. Xie, R. Y. Lau, and Z. Wang, "Multi-class generative adversarial networks with the 12 loss function," arXiv preprint arXiv:1611.04076, 2016.
8. M. Arjovsky, S. Chintala, and L. Bottou, "Wasserstein gan," arXiv preprint arXiv:1701.07875, 2017.
9. F. Yu, V. Koltun, and T. Funkhouser, "Dilated residual networks," arXiv preprint arXiv:1705.09914, 2017.

10. G. Huang, Z. Liu, K. Q. Weinberger, and L. van der Maaten, "Densely connected convolutional networks," arXiv preprint arXiv:1608.06993, 2016.

(2) PRINCIPAL ASPECTS

Various embodiments of the invention include three "principal" aspects. The first is a system for adapting a deep convolutional neural network. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
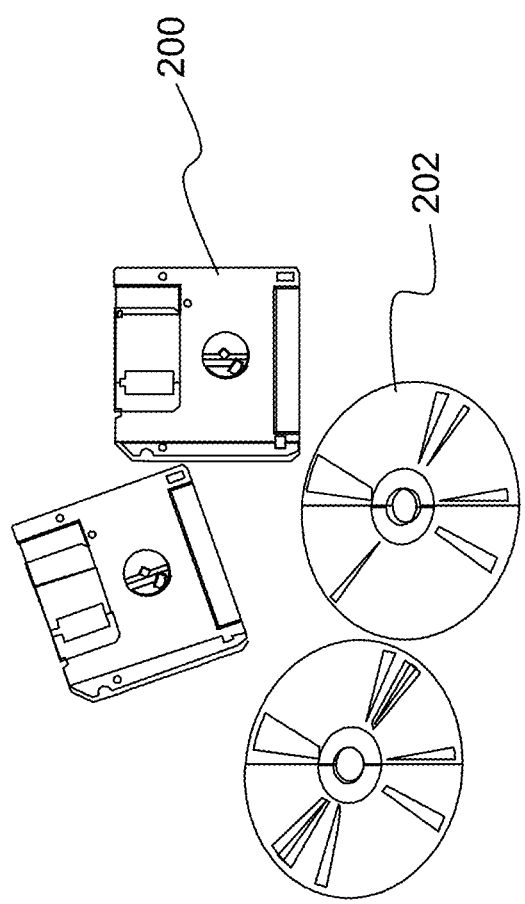
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a general framework for domain adaption, which allows deep neural networks trained on a source domain to be tested on a different target domain without requiring any training annotations in the target domain. Currently, deep convolutional neural networks (CNNs) achieve state-of-the art performance on many image understanding tasks including: object detection and classification (e.g., pedestrian detection, traffic sign detection), segmentation (e.g., drivable surface segmentation), monocular depth estimation (e.g., 3D vision), and captioning (e.g. automated image and video captioning systems). These networks require huge amounts of training images (e.g., tens of thousands to millions), which depending on the application could be relatively easy to collect, but also require the training images to be annotated. Human annotation is often used as the ground truth label that the network is expected to learn to predict. Obtaining human annotations/labeling is extremely time consuming, costly and does not scale well. Domain adaptation attempts to solve this problem by allowing a network to be trained on an existing labeled dataset, and then adapted to a new image domain using images from the target domain with minimal or no labels/annotations.

Figure 8:
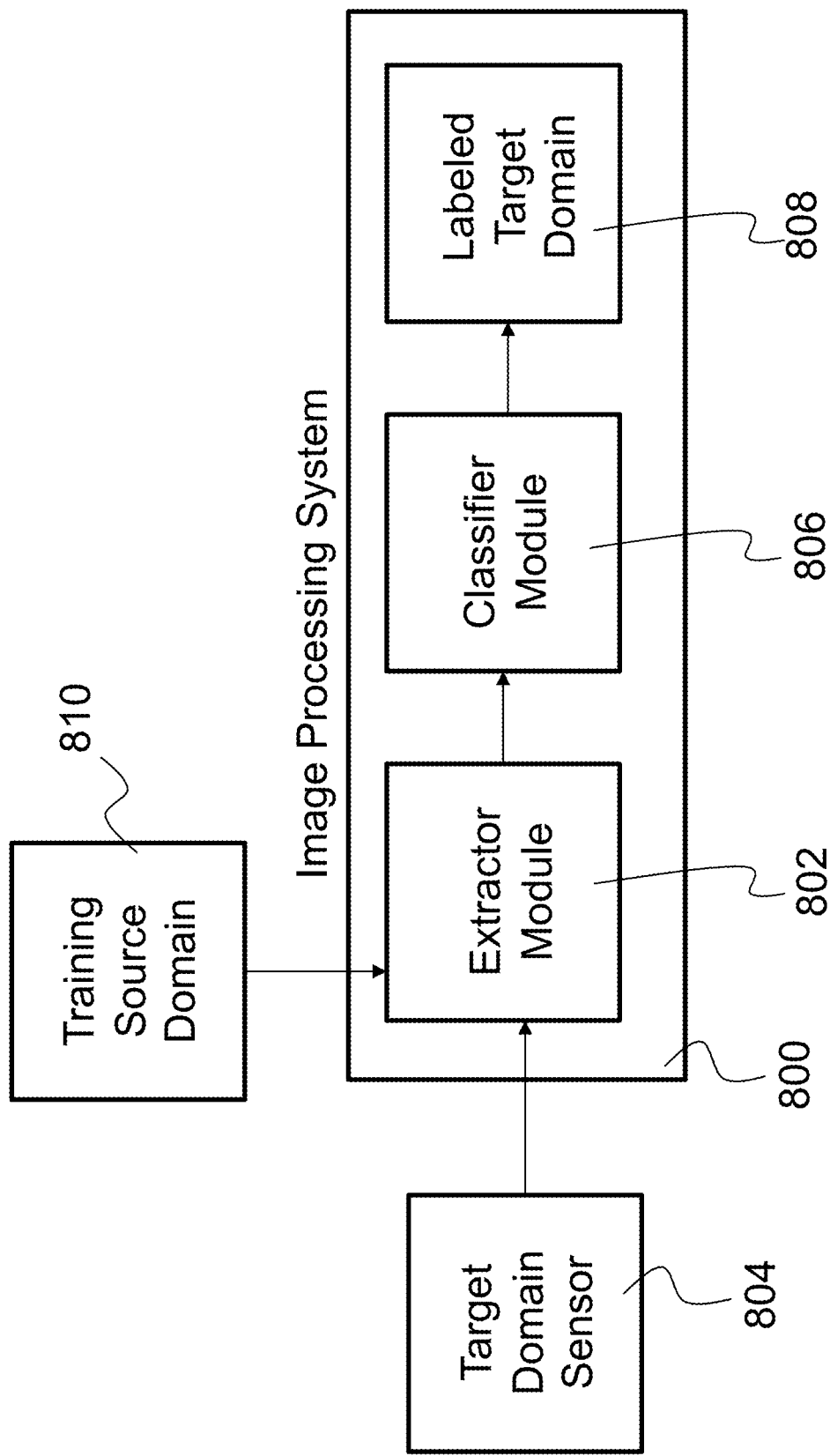
FIG. 8 is a flow diagram illustrating an image processing system according to some embodiments of the present disclosure.

FIG. 8 depicts an image processing system (element 800) comprising a convolutional neural network (CNN). CNNs are made of two parts: a deep feature extractor module (element 802), which maps an input image obtained from a target domain sensor (element 804) into a feature space, and a linear classifier (or regressor) module (element 806), which maps the features to the desired output, such as a labeled target domain (element 808). As shown in FIG. 8, the feature extractor module (element 802) is trained by a training source domain (element 810). The invention described herein is a general framework and system which adds extra networks and losses to help regularize the learning of the feature extractor module to make it domain agnostic (i.e., not domain specific). The domain agnostic nature of the features in the latent space enforces the the networks to extract only the shared knowledge between the two domains. Therefore, this constraint boosts the transferability of knowledge (e.g., classification, segmentation) from one-domain to another.

Many existing methods for domain adaptation arise as special cases of the framework. The method according to embodiments of the present disclosure includes two unique ways to improve the domain adaptation performance by re-designing the feature extractors that are learned. First, the system improves the domain adaptation performance by requiring that the distributions of features extracted from both domains are indistinguishable (as judged by an adversarial discriminator network), which is described in detail below. In short, an adversarial network (FIG. 4, module 412) is trained to distinguish the features coming from domain X from that of domain Y, and the encoders (FIG. 4, modules 408 and 410) are constrained to map the domains in the feature space (i.e., the latent space, FIG. 4, module 400) such that the adversary, module 412, cannot tell apart the domains. This was first proposed by Hoffman et al. (see Literature Reference No. 1), but alone does not give a strong enough constraint to make the features fully domain agnostic, as two distributions can be matched in infinitely many ways.

Figure 4:
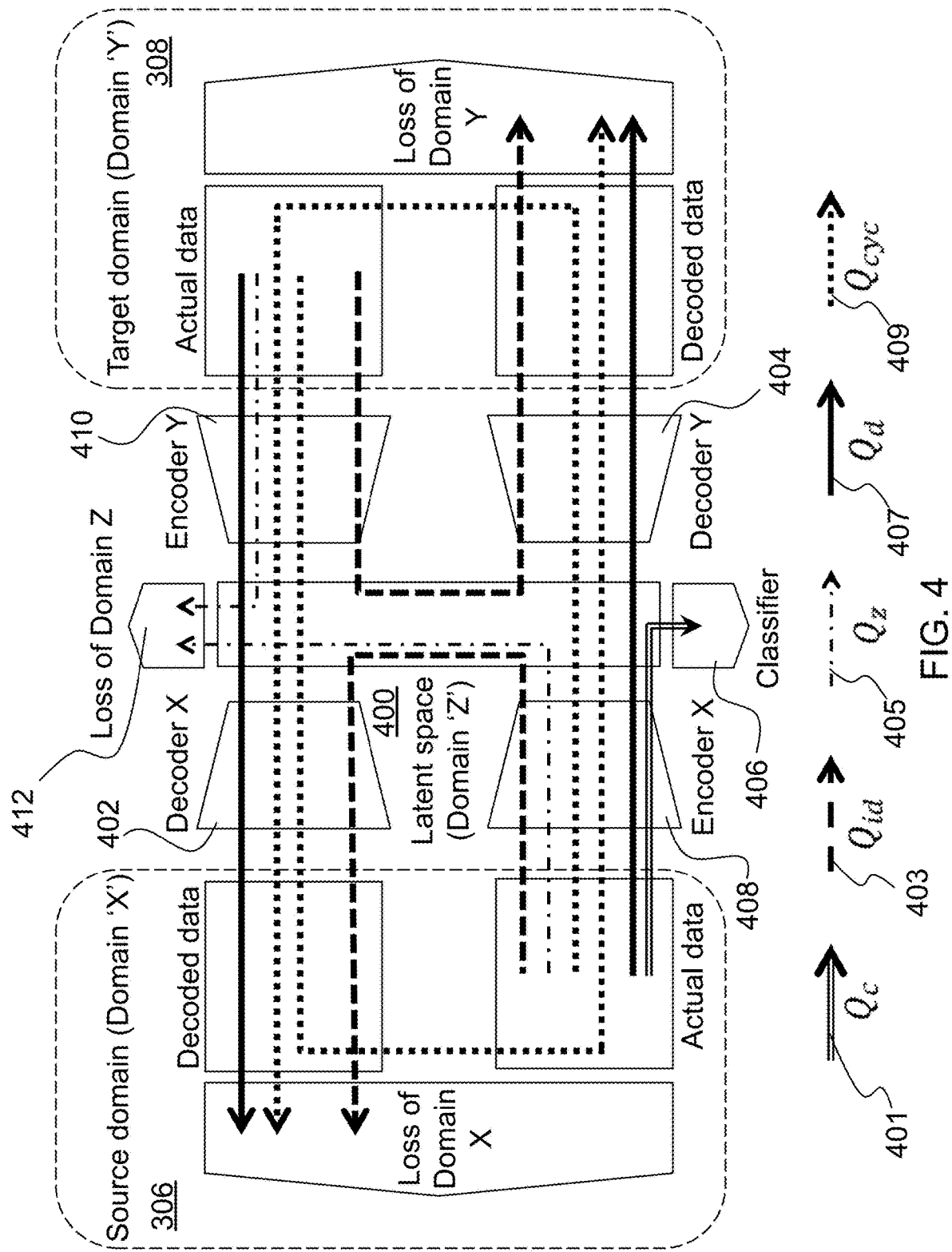
FIG. 4 is an illustration of the detailed system architecture of the TS$^2$ showing pathways to loss modules according to some embodiments of the present disclosure.

Second, the system improves the domain adaptation performance by requiring that the features are able to be decoded back to the images well (as measured by the reconstruction error between the original image and the decoded image, FIG. 4, 403). This idea was originally used by Ghifary et al. (see Literature Reference No. 2), but is much simpler than the method used for recovering the images described herein. The image decoding process according to embodiments of the present disclosure is similar to that described by Zhu et al. (see Literature Reference No. 3); however, Zhu et al. does not use it for the domain adaptation problem.

The disclosed method allows for adapting a deep convolutional neural network trained on a source domain with labels to a target domain without requiring any new labels. For example, in autonomous driving applications, a semantic segmentation network is required to be trained to detect roads, cars, pedestrians, etc. Training such a segmentation network requires semantic, instance-wise, dense pixel annotations for each scene, which is excruciatingly expensive and time consuming to acquire. To avoid human annotations, a large body of work focuses on designing photo-realistic simulated scenarios in which the ground truth annotations are readily available. Cityscapes and Virtual KITTI datasets are examples of such simulations, which include a large number of synthetically generated driving scenes together with ground truth pixel-level semantic annotations (see Literature Reference Nos. 4 and 5). Training a CNN based on such synthetic data and applying it to a dashboard mounted camera (i.e., real-world images) will give very poor performance due to the large differences in image characteristics. The invention described herein allows such a network to be adapted to the new image data without requiring any new labels. The method outperforms and provides an improvement over existing state-of-the-art (SOA) methods.

Figure 3:
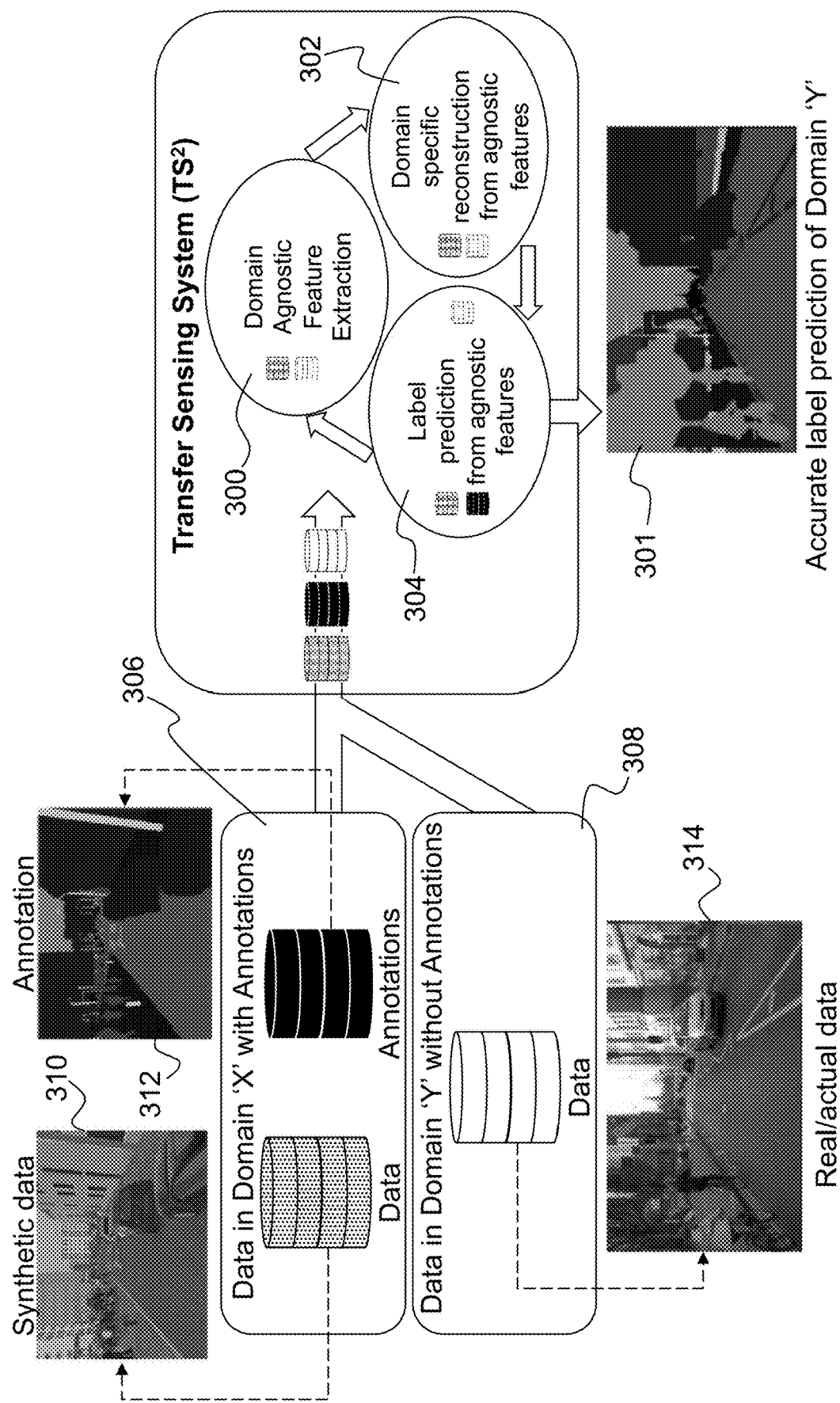
FIG. 3 is an illustration of the high-level system architecture of the Transfer Sensing System (TS$^2$) according to some embodiments of the present disclosure.

The method and system described herein is broadly applicable to any image understanding and sensing task where training labels are not available in the target domain. Other examples of this include: 1) human activity recognition in infrared (IR) images which are trained using existing annotated RGB (red, green, blue) images, and 2) monocular depth estimation trained on synthetic data. A system level architecture of the system according to embodiments of the present invention is depicted in FIG. 3. As shown in FIG. 3, the interplay between the 'domain agnostic feature extraction' 300, 'domain specific reconstruction from agnostic features' 302, and 'label prediction from agnostic features' 304 enables the framework to simultaneously learn from the source domain (i.e., data in domain 'X' with annotations 306) and adapt to the target domain (i.e., data in domain 'Y' without annotations 308) to generate an accurate label prediction of domain 'Y' 301. In one embodiment, the accurate label prediction is the pixel level annotation of the scene, such as depicted in FIG. 3 where different colors demonstrate different labels (e.g., car, bike, drivable surface).

Consider training images $x_i \in X$ (synthetic data 310) and their corresponding annotations/labels $c_i \in C$ (annotation 312) from the source domain (i.e., domain X (element 306)). Note that $c_i$ may be an image level, such as in classification, or pixel level in the case of semantic segmentation. Also, consider target images $y_j \in Y$ (real data 314) in the target domain (i.e., domain Y (element 308)), where there are not corresponding annotations for these images. Note that the framework is readily extendable to a scenario where there are annotations for few images in the target domain. In addition, it is assumed that there are not correspondences between images in the source and target domains (e.g., elements 306 and 308). The lack of correspondences assumption makes the problem significantly more challenging and is one of the unique capabilities of the system described herein.

FIG. 4 depicts a detailed system architecture of the TS² framework according to embodiments of the present disclosure. The pathways to the loss modules denote the inputs to these modules, which are used for training TS². The general idea behind the approach according to embodiments of the present disclosure is to find a joint latent space, Z (element 400), for the source and target domains, X and Y (elements 306 and 308), where the representations are domain agnostic.

To clarify this point, consider the scenario in which X (element 306) is the domain of driving scenes/images on a sunny day and Y (element 308) is the domain of driving scenes in a rainy day. While 'sunny' and 'rainy' are characteristics of the source and target domains (elements 306 and 308), they are truly nuisance variations with respect to the annotation/classification task (e.g., semantic segmentation of the road), as they should not affect the annotations. Treating such characteristics as structured noise, the goal is to find a latent space, Z (element 400), that is invariant to such variations. In other words, domain Z (element 400) should not contain domain specific characteristics, hence it should be domain agnostic. For example, rain in a rainy driving scene is treated as a nuisance parameter for the semantic segmentation module. Similarly, lighting variations between day and night are nuisance parameters for the semantic segmentation task. In what follows, the process that leads to finding such domain agnostic latent space is described.

Let the mappings from source and target domains (elements 306 and 308) to the latent space (element 400) be defined as $f_x: X \to Z$ and $f_y: Y \to Z$, respectively. Following FIG. 4, $f_x$ and $f_y$ are the 'Encoder X' (element 408) and 'Encoder Y' (element 410) modules. In the framework, these mappings are parameterized by deep convolutional neural networks (CNNs). Note that the members of the latent space $z \in Z$ (element 400) are high dimensional vectors in the case of image level tasks, or feature maps in the case of pixel level tasks. Also, let h: $Z \to C$ be the classifier (element 406) that maps the latent space (element 400) to labels/annotations (e.g., pixel level class labels in segmentation: 'car', 'pedestrian', 'drivable surface'). Given that the annotations for the source domain X (element 306) are known, one can easily define a supervised loss function to enforce $h(f_x(x_i)) = c_i$:

$$Q_c = \Sigma_i l_c(h(f_x(x_i)), c_i), \qquad (1) \text{ (element 401)}$$

where $l_c$ is an appropriate loss (e.g., cross entropy for classification and segmentation). $Q_c$ (element 401) denotes measuring classification error. A loss function maps an event or values of one or more variables onto a real number intuitively representing some "cost" associated with the event. An optimization problem seeks to minimize the loss function. Minimizing the above loss function leads to the standard approach of supervised learning, which does not concern domain adaptation. While this approach would lead to a method that performs well on the images in the source domain (element 306), $x_i \in X$, it will more often than not perform poorly on images from the target domain (element 308) $y_j \in Y$. The reason is that domain Z (element 400) is biased to the distribution of the structured noise ('sunny') in domain X (element 306), and the structured noise in domain Y (element 308) ('rainy') confuses the classifier (element 406) h(·)

To avoid such confusion, the latent space, Z, (element 400) is required to be domain agnostic, so it is not sensitive to the domain specific structured noise. To achieve such latent space (element 400), a variety of auxiliary networks and losses are introduced to help regularize the latent space (element 400) and consequently achieve a robust h(·). The auxiliary networks and loss pathways are depicted in FIG. 4. The following is a description of the individual components of the regularization losses.

1. Z (element 400) is required to preserve the core information of the target (element 308) and source (element 306) images and only discard the structured noise. To impose such constraint on the latent space (element 400), first define decoders $g_x: Z \to X$ (element 402) and $g_y: Z \to Y$ (element 404) that maps the features in the latent space (element 400) to the source and target domains (elements 306 and 308), respectively. It is assumed that if Z (element 400) retains the crucial/core information of the domains and only discards the structured noise, then the decoders (elements 402 and 404) should be able to add the structured noise back and reconstruct each image from their feature representation in the latent space, Z (element 400). In other words, it is required that $g_x(f_x(\cdot))$ and $g_y(f_y(\cdot))$ be close to identity functions/maps (i.e., $g_x(f_x(x)) = x$ and $g_y(f_y(y)) = y$). This constraint leads to the following loss function:

$$Q_{id} = \Sigma_i l_{id}(g_x(f_x(x_i)), x_i) + \Sigma_j l_{id}(g_y(f_y(y_j)), y_j), \qquad (2) \text{ (element 403)}$$

where $l_{id}(\cdot, \cdot)$ is a pixel-wise image loss, such as $L_p$ norms, which is defined as:
$L_p(g_x(f_x(x)), x) = (\int_{x'} |g_x(f_x(x)) - x|^p dx)^{1/p}$. $Q_{id}$ (element 403) is equivalent to measuring reconstruction error.

2. Ideally, the latent space Z (element 400) is domain agnostic meaning that the feature representations of the source and target domain (elements 306 and 308) should not contain domain specific information. To achieve this, an adversarial setting is used in which a discriminator $d_z: Z \to \{c_x, c_y\}$ tries to classify if a feature in the latent space $z \in Z$ (element 400) was generated from domain X (element 306) or Y (element 308), where $c_x$ and $c_y$ are two-dimensional domain identifier one-hot vectors. The loss function then can be defined as the number of correct guesses of the discriminator (i.e., domain agnosticism is equivalent to fooling the discriminator), and, therefore, the loss function can be formulated as:

$$Q_z = \Sigma_i l_c(d_z(f_x(x_i)), c_x) + \Sigma_j l_c(d_z(f_y(y_j)), c_y),$$ (3) (element 405)

where $l_c(\cdot,\cdot)$ is the cross entropy loss function. $Q_z$ (element 405) denotes measuring distributional discrepancy.

3. To further ensure that the mappings $f_x$, $f_y$, $g_x$, and $g_y$ are consistent, half cycle adversarial losses are defined. An image from a target domain (element 308) is first encoded to the latent space via an encoder Y (element 410) and then decoded to the source domain (element 306) via a decoder X (element 402) to generate a 'fake' image. Furthermore, an image from a source domain (element 306) is first encoded to the latent space via an encoder X (element 408) and then decoded to the target domain (element 308) via a decoder Y (element 404) to generate a 'fake' image. Next, define discriminators $d_x$: X→$\{c_x, c_y\}$ and $d_y$: Y→$\{c_x, c_y\}$ to identify if an image is 'fake' (generated from the other domain) or 'real' (belonged to the actual domain). To formulate this half cycle loss function write:

$$Q_d = \Sigma_i l_c(d_y(g_y(f_x(x_i))), c_x) + \Sigma_j l_c(d_x(g_x(f_y(y_j))), c_y).$$ (4) (element 407).

$Q_d$ denotes measuring distributional discrepancy.

4. Given that there are no correspondences between the images in the source and target domains (elements 306 and 308), there is a need to ensure that the semantically similar images (e.g., images with similar content, like similar driving scenes or similar classes of images) in both domains are projected into close vicinity of one another in the latent space (element 400). To ensure this, define full cycle losses where the 'fake' image generated in the half cycle loss, $g_x(f_y(y_j))$ or $g_y(f_x(x_i))$, are encoded back to the latent space (element 400) and then decoded back to their original space. The entire cycle should be equivalent to an identity mapping. This loss can be formulated as follows:

$$Q_{cyc} = \Sigma_i l_{id}(g_x(f_y(g_y(f_x(x_i)))), x_i) + \Sigma_j l_{id}(g_y(f_x(g_x(f_y(y_j))), y_j).$$ (5) (element 409).

The above general loss function is then optimized via the Stochastic Gradient Descent (SGD) method with adaptive learning rate, in an end-to-end manner. FIG. 4 shows the pathways for each loss function defined above. The discriminative networks, dx, dy and dz are trained in an alternating optimization alongside with the encoders (elements 408 and 410) and decoders (elements 402 and 404). Many different loss schemes have been proposed in the generative adversarial network (GAN) literature including the binary cross entropy loss (BCE) (see Literature Reference No. 6), the least squares loss (LSGAN) (see Literature Reference No. 7), and the Wasserstein loss (WGAN) (see Literature Reference No. 8), and any of these are satisfactory for the task.

The following shows how various previous methods for domain adaptation are special cases of the method described herein. Setting λid=λcyc=λd=O and fx=fy, would lead to the work of Literature Reference No. 1. By setting λid=λcyc=λd=λz=O and fx=fy, the work of Literature Reference No. 2 is recovered. By setting λc=λz=O, the work of Literature Reference No. 3 is recovered. The convolutional networks in the model according to embodiments of the present disclosure are interchangeable, but it was found from experimental studies that the best performance was achieved by using Dilated Densely-Connected Networks (i.e., Dilated DenseNets) for the encoders which are derived by replacing strided convolutions with dilated convolutions (see Literature Reference No. 9) in the DenseNet architecture (see Literature Reference No. 10). Simple multi-layer residual blocks are used followed by deconvolutional layers for the decoders as described in Literature Reference No. 3. For the discriminators, a few convolutional layers are used following Literature Reference No. 3.

The TS² system described herein was trained on the Virtual KITTI Dataset, which is a photo-realistic synthetic video dataset designed to learn and evaluate computer vision models for several video understanding tasks: object detection and multi-object tracking, scene-level and instance-level semantic segmentation, optical flow, and depth estimation (see Literature Reference No. 4). Virtual KITTI contains 50 high-resolution monocular videos (21,260 frames) generated from five different virtual worlds in urban settings under different imaging and weather conditions. Videos of 'sunny' weather condition with their semantic segmentation annotations were utilized as the source domain (element 306), 'X', and the videos of 'rainy' weather condition without the semantic segmentation annotations were used as the target domain (element 308), 'Y'.

Figure 5:
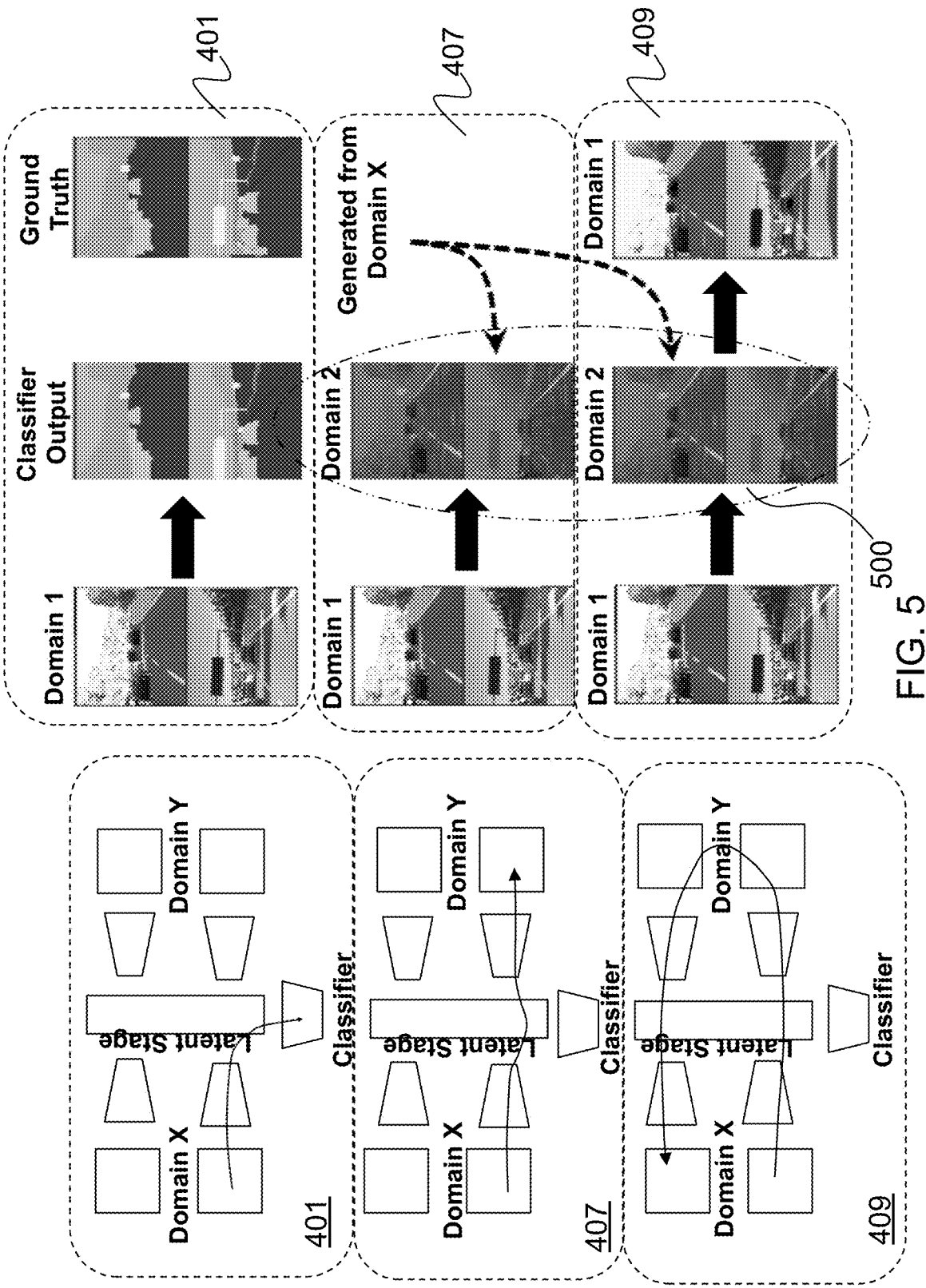
FIG. 5 is an illustration showing the performance of TS$^2$ after training according to some embodiments of the present disclosure.

FIG. 5 shows the results of different pathways in the TS² framework described herein after training. In short, pathway 401 enforces that the latent space be a discriminative space for Domain X, meaning that the images should be labeled/classified correctly. Pathway 403 enforces the latent space to maintain the information in domains X and Y, by constraining the extracted features to be capable of recovering original images in domains X and Y. Pathway 405 enforces the latent space to be domain agnostic, while pathway 407 enforces a domain-to-domain image translation (e.g., rainy to sunny, or night to day image translation; see FIG. 5). Finally, pathway 409 enforces the encoders and decoders to have cycle consistency, meaning that translating an input image from domain X to domain Y and then back from domain Y to domain X should lead to recovering the input image and vice versa. It can be seen that the Qc, Qd, and Qcyc (elements 401, 407, and 409) have all been trained correctly, and the mappings fx, fy, gx and gy are achieving what is expected. As depicted in FIG. 4, element 401, shows that the input image is labeled correctly, element 407 shows domain-to-domain translation is performed correctly, and element 409 shows that the mappings are cycle consistent. Note that the generated images from domain X (element 500), are 'fake' images in the sense that they are calculated from gyfxxi, but yet they look quite convincingly like 'real' rainy images.

FIGS. 7A and 7B depict training of a deep CNN according to embodiments of the present disclosure. Following a start (element 700) of the process, there are two pathways: one stemming from an annotated source domain, X (element 702), and one stemming from an unannotated target domain, Y (element 704). The annotated source domain, X (element 702), is encoded via a source neural encoder (element 704). The unannotated target domain, Y (element 704), is encoded via a target neural encoder (element 706). The process depicted in FIG. 7A follows as described for FIG. 4. As in training any machine learning algorithm with a gradient-descent (or in this case with a stochastic gradient descent (SGD)) algorithm, FIG. 7B illustrates a terminate criterion to identify that training is completed in the system described herein. In this case, the termination (end element 710) can be achieved via various protocols, one of which is comparing the total loss value (element 712) to a predefined threshold (element 714). The system determines if the loss is less than the threshold (element 716). The learning process is terminated (element 710) if the loss (element 712) is lower or equal to this threshold (element 714). If the loss (element 712) is larger than the threshold (element 714), then the algorithm takes another step toward reducing the loss function (element 712) by backpropagating through source and target encoders and decoders as well as the classifier to minimize the loss (element 716). Then, the process proceeds back to start (element 700) through a series of learning iterations (element 718).

The invention according to embodiments of the present disclosure is of particular value to fully autonomous navigation systems for vehicle manufacturers. $TS^2$ will significantly reduce the amount of annotated real-world training data needed to train their perception and sensing algorithms. Furthermore, thanks to its domain agnostic feature extraction capability, $TS^2$ produces more robust results when navigating in novel or unseen conditions, such as a new city or in rare weather conditions (e.g., snow, fog, rain).

The annotations for the target image domain obtained by the $TS^2$ framework can be used for detection and recognition of objects, such as vehicles, pedestrians, and traffic signs, under different weather conditions (e.g., rain, snow, fog) and lighting conditions (e.g., low light, bright light). Thus, the annotations can then be utilized to cause an automatic operation related to controlling a component of the autonomous vehicle.

Figure 6:
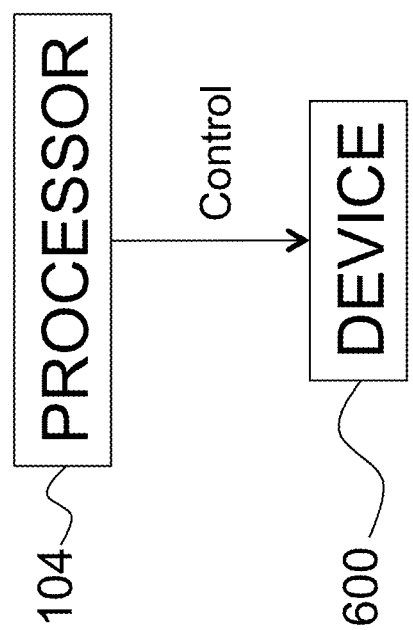
FIG. 6 is a flow diagram illustrating using a processor to control a device using label predictions according to some embodiments of the present disclosure.

FIG. 6 is a flow diagram illustrating using the processor 104 to control a device 600 using the annotations for the target image. Non-limiting examples of devices 600 that can be controlled via the processor 104 include a motor vehicle or a motor vehicle component (electrical, non-electrical, mechanical), such as a brake, a steering mechanism, suspension, or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object detection and recognition, the system can cause the autonomous vehicle to perform a driving operation/maneuver (such as steering or another command) in line with driving parameters in accordance with the recognized object. For example, if the system recognizes a bicyclist, another vehicle, or a pedestrian, the system described herein can cause a vehicle maneuver/operation to be performed to avoid a collision with the bicyclist or vehicle (or any other object that should be avoided while driving). The system can cause the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented. For instance, the method can be applied to border security (e.g., detecting smugglers at night), intelligence, surveillance, and reconnaissance (ISR), drones, autonomous vehicles, and perception and safety in autonomous systems (e.g., detecting humans interacting with robots in a manufacturing environment).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for adapting a deep convolutional neural network (CNN), the system comprising:
one or more processors and a non-transitory computer-readable medium having executable instructions encoded thereon such that when executed, the one or more processors perform operations of:
training a deep CNN on an annotated source image domain;
adapting the deep CNN to a new target image domain without requiring new annotations by determining domain agnostic features that map from the annotated source image domain and a target image domain to a joint latent space and using the domain agnostic features to map the joint latent space to annotations for the target image domain;
wherein the joint latent space is invariant to any structured noise variations between the annotated source image domain and the target image domain; and
wherein decoders add back structured noise variations for reconstructing each image domain from its domain agnostic features in the joint latent space.

2. The system as set forth in claim 1, wherein the joint latent space is regularized by a plurality of auxiliary networks and loss functions.

3. The system as set forth in claim 1, where in using the domain agnostic representations to map the joint latent space to annotations for the target image domain, the one or more processors further perform operations of:
using an adversarial setting in which a discriminator tries to classify if a domain agnostic feature in the joint latent space was generated from the annotated source image domain or the target image domain; and
optimizing a cross entropy loss function that is defined as a number of correct classifications of the discriminator.

4. The system as set forth in claim 1, where in using the domain agnostic representations to map the joint latent space to annotations for the target image domain, the one or more processors further perform operations of:
encoding an image from its actual domain to the joint latent space via an encoder, wherein the actual domain is one of the annotated source image domain and the target image domain;
decoding the image to the other domain via a decoder, wherein the other domain is the other of the annotated source image domain and the target image domain, such that a synthetic image is generated; and
identifying if the synthetic image belongs to the actual domain or the other domain.

5. The system as set forth in claim 4, wherein the one or more processors further perform operations of:
  encoding the synthetic image back to the joint latent space; and
  decoding the synthetic image back to its actual domain.

6. The system as set forth in claim 1, wherein a device is controlled based on the annotations for the target image domain.

7. The system as set forth in claim 6, wherein the device is a mechanical component of an autonomous vehicle.

8. A computer implemented method for adapting a deep convolutional neural network (CNN), the method comprising an act of:
  causing one or more processors to execute instructions encoded on a non-transitory computer-readable medium, such that upon execution, the one or more processors perform operations of:
  training a deep CNN on an annotated source image domain;
  adapting the deep CNN to a new target image domain without requiring new annotations by determining domain agnostic features that map from the annotated source image domain and a target image domain to a joint latent space and using the domain agnostic features to map the joint latent space to annotations for the target image domain;
  wherein the joint latent space is invariant to any structured noise variations between the annotated source image domain and the target image domain; and
  wherein decoders add back structured noise variations for reconstructing each image domain from its domain agnostic features in the joint latent space.

9. The method as set forth in claim 8, wherein the joint latent space is regularized by a plurality of auxiliary networks and loss functions.

10. The method as set forth in claim 8, where in using the domain agnostic representations to map the joint latent space to annotations for the target image domain, the one or more processors further perform operations of:
  using an adversarial setting in which a discriminator tries to classify if a domain agnostic feature in the joint latent space was generated from the annotated source image domain or the target image domain; and
  optimizing a cross entropy loss function that is defined as a number of correct classifications of the discriminator.

11. The method as set forth in claim 8, where in using the domain agnostic representations to map the joint latent space to annotations for the target image domain, the one or more processors further perform operations of:
  encoding an image from its actual domain to the joint latent space via an encoder, wherein the actual domain is one of the annotated source image domain and the target image domain;
  decoding the image to the other domain via a decoder, wherein the other domain is the other of the annotated source image domain and the target image domain, such that a synthetic image is generated; and
  identifying if the synthetic image belongs to the actual domain or the other domain.

12. The method as set forth in claim 11, wherein the one or more processors further perform operations of:
  encoding the synthetic image back to the joint latent space; and
  decoding the synthetic image back to its actual domain.

13. A computer program product for adapting a deep convolutional neural network (CNN), the computer program product comprising:
  computer-readable instructions stored on a non-transitory computer-readable medium that are executable by a computer having one or more processors for causing the processor to perform operations of:
  training a deep CNN on an annotated source image domain;
  adapting the deep CNN to a new target image domain without requiring new annotations by determining domain agnostic features that map from the annotated source image domain and a target image domain to a joint latent space and using the domain agnostic features to map the joint latent space to annotations for the target image domain;
  wherein the joint latent space is invariant to any structured noise variations between the annotated source image domain and the target image domain; and
  wherein decoders add back structured noise variations for reconstructing each image domain from its domain agnostic features in the joint latent space.

14. The computer program product as set forth in claim 13, wherein the joint latent space is regularized by a plurality of auxiliary networks and loss functions.

15. The computer program product as set forth in claim 13, where in using the domain agnostic representations to map the joint latent space to annotations for the target image domain, the one or more processors further perform operations of:
  using an adversarial setting in which a discriminator tries to classify if a domain agnostic feature in the joint latent space was generated from the annotated source image domain or the target image domain; and
  optimizing a cross entropy loss function that is defined as a number of correct classifications of the discriminator.

16. The computer program product as set forth in claim 13, where in using the domain agnostic representations to map the joint latent space to annotations for the target image domain, the one or more processors further perform operations of:
  encoding an image from its actual domain to the joint latent space via an encoder, wherein the actual domain is one of the annotated source image domain and the target image domain;
  decoding the image to the other domain via a decoder, wherein the other domain is the other of the annotated source image domain and the target image domain, such that a synthetic image is generated; and
  identifying if the synthetic image belongs to the actual domain or the other domain.

17. The computer program product as set forth in claim 16, wherein the one or more processors further perform operations of:
  encoding the synthetic image back to the joint latent space; and
  decoding the synthetic image back to its actual domain.

* * * * *